Aug. 16, 1955 T. F. McCARTHY 2,715,502
CONVEYOR CHAIN HOLD DOWN AND CRUSHER AT TRANSFER STATION
Filed Oct. 30, 1953 3 Sheets-Sheet 1

INVENTOR.
TIMOTHY F. McCARTHY
BY
Murray A. Gleeson
ATTORNEY

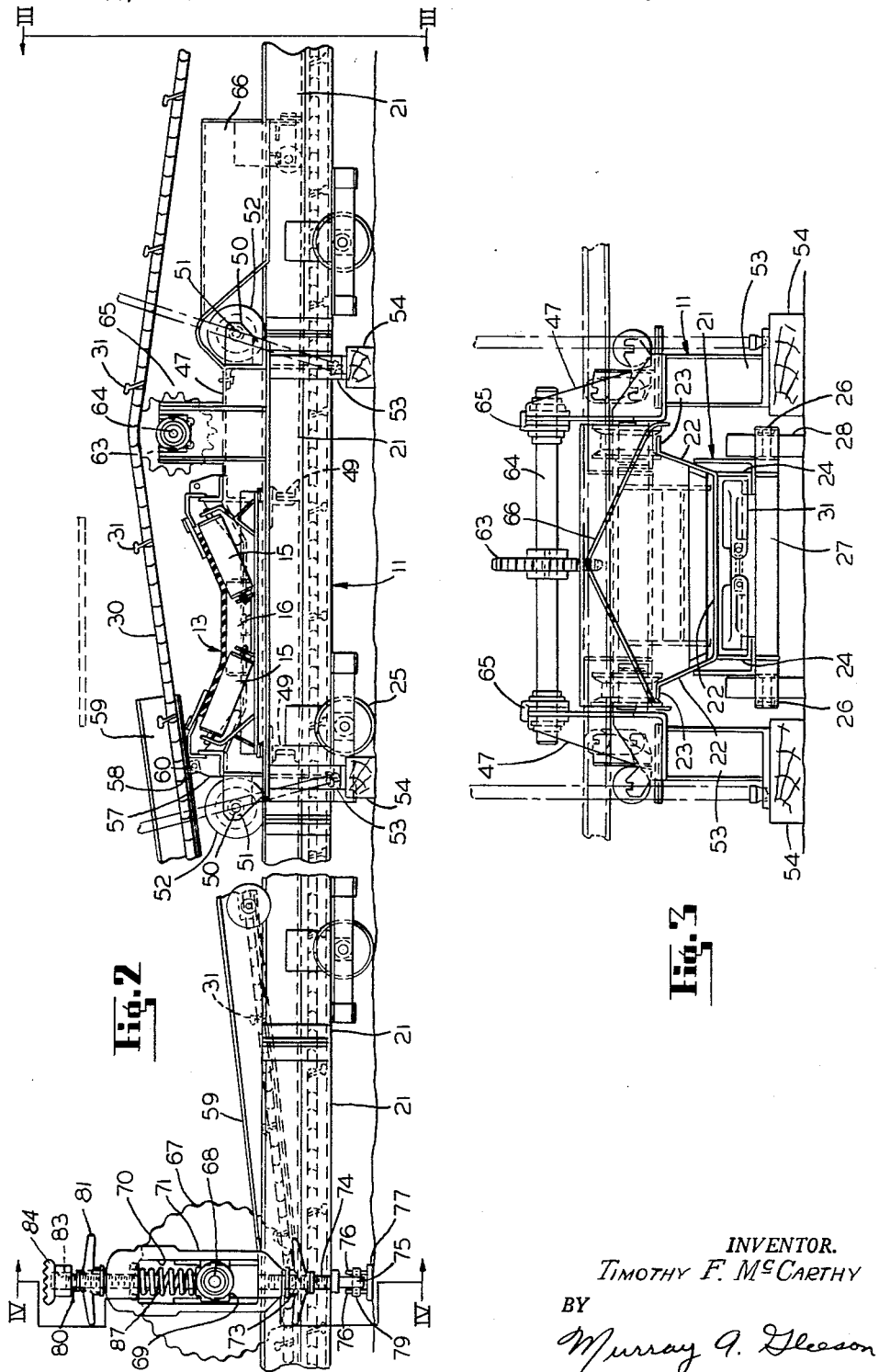

Aug. 16, 1955 T. F. McCARTHY 2,715,502
CONVEYOR CHAIN HOLD DOWN AND CRUSHER AT TRANSFER STATION
Filed Oct. 30, 1953 3 Sheets-Sheet 3

INVENTOR.
TIMOTHY F. McCARTHY
BY
Murray G. Gleeson
ATTORNEY

United States Patent Office 2,715,502
Patented Aug. 16, 1955

2,715,502

CONVEYOR CHAIN HOLD DOWN AND CRUSHER AT TRANSFER STATION

Timothy F. McCarthy, Indiana, Pa., assignor to Goodman Manufacturing Company, Chicago, Ill., a corporation of Illinois Application October 30, 1953, Serial No. 389,445

2 Claims. (Cl. 241—200)

This invention relates to improvements in conveyors and more particularly relates to an improved form of holddown for the conveying element of a conveyor of a type used underground in mines, for holding the conveying element to the incline of an intermediate transfer station for elevating the conveying element and transferring material thereon to a cross gathering conveyor which may extend at right angles with respect thereto.

In mining coal underground, the practice has been developed of loading directly from a loading machine or a continuous mining machine onto a room conveyor extending into the working place and of transferring the material from this conveyor into a main gathering conveyor which may be intermediate the ends of the room conveyor. In order to effect the transfer of the coal to the main gathering conveyor, transfer stations have been provided, which are held stationary during the loading operation, but which may accommodate movement of the room conveyor as the working place is extended, to accommodate the extension of the room conveyor without changing the position of the main cross conveyor and which may also be moved along the room conveyor as the main cross conveyor is relocated as shown and described in my application Serial No. 260,215, filed December 6, 1951, and entitled "Automatic Coal Transfer Conveyor."

The transfer station usually consists in an inclined transfer trough nested within the trough or pan of the room conveyor, and elevating the conveyor chain and its flights and the material carried thereby for discharging its load onto the main cross or gathering conveyor, which may extend between the load carrying and return runs of the room conveyor.

Where such transfer stations have been used, it has been extremely difficult to hold-down the room conveyor chain and flights to conform to the incline of the transfer pan. While the usual hold-down guides extending inwardly from the side walls of the transfer pan have frequently been used, such guides are not satisfactory particularly with a single strand chain, since the flights oftentimes get out of line and tilt up, striking the ends of the guides and frequently tearing up the chain and guides. Where the flights properly enter the guides, due to the tendency of the chain and flights to rise above the transfer pan, friction between the flights and guides is so great that considerable heat is generated, which results in fast wear on the guides and flights.

A principal object of my invention is to remedy these difficulties by providing a simple and improved form of floating hold-down means, for holding down a conveyor chain and flights to conform to the inclination of an inclined transfer pan, elevating the chain and flights and the load carried thereby, for transferring the load to a cross main gathering conveyor.

A further object of my invention is to provide a novel and efficient hold-down means for holding down the chain and flights of a room conveyor as they enter a transfer station, in which a freely rotatable wheel engages the upper run of the conveyor chain and is guided for vertical movement with respect to the chain, but is yieldably biased into engagement with the conveyor chain.

A further object of my invention is to provide a hold-down for a conveyor chain and flights as they enter the inclined load lifting pan of a transfer station, in which a freely rotatable wheel is journaled for rotation about a horizontal axis and is yieldably engaged with the chain of the conveyor, to break up large chunks of coal as they pass thereby through the center of the conveyor, and to ride over rock or lumps that will not crush.

A still further object of my invention is to provide a hold-down means for the chain and flights of a room conveyor as it enters a transfer station, to be lifted to discharge onto a main cross conveyor, in which a toothed wheel engages the cross pins or rollers of the chain conveyor to hold-down the same to conform to the incline of the inclined transfer pan and is guided for vertical movement with respect to the room conveyor and yieldably biased into engagement with the chain, with sufficient force to cause the wheel to break up large chunks of coal, but to accommodate the wheel to yield vertically and ride over rock that cannot be crushed.

A still further object of my invention is to hold-down the chain and flights of a main room conveyor of a type used in mines, to conform to the angle of the inclined pan of a load lifting and transferring transfer station, by engaging the chain and flights with a toothed wheel guided for rectilinear vertical movement and yieldably biased into engagement with the chain, and breaking up chunks and lumps of coal and riding over rock that cannot be crushed.

These and other objects of my invention will appear from time to time as the following specification proceeds and with reference to the accompanying drawing wherein Figure 1 is a diagrammatic horizontal sectional view taken through a working place of a mine and illustrating a mining system in which the mined coal is transferred directly from a room or transfer conveyor onto a main transversely extending gathering conveyor and showing a hold-down means constructed in accordance with my invention at the inby end of the transfer station of the room conveyor:

Figure 2 is an enlarged fragmentary view in side elevation of the conveyor looking substantially along line 2—2 of Figure 1;

Figure 3 is a fragmentary sectional view taken substantially along line 3—3 of Figure 2;

Figure 1:
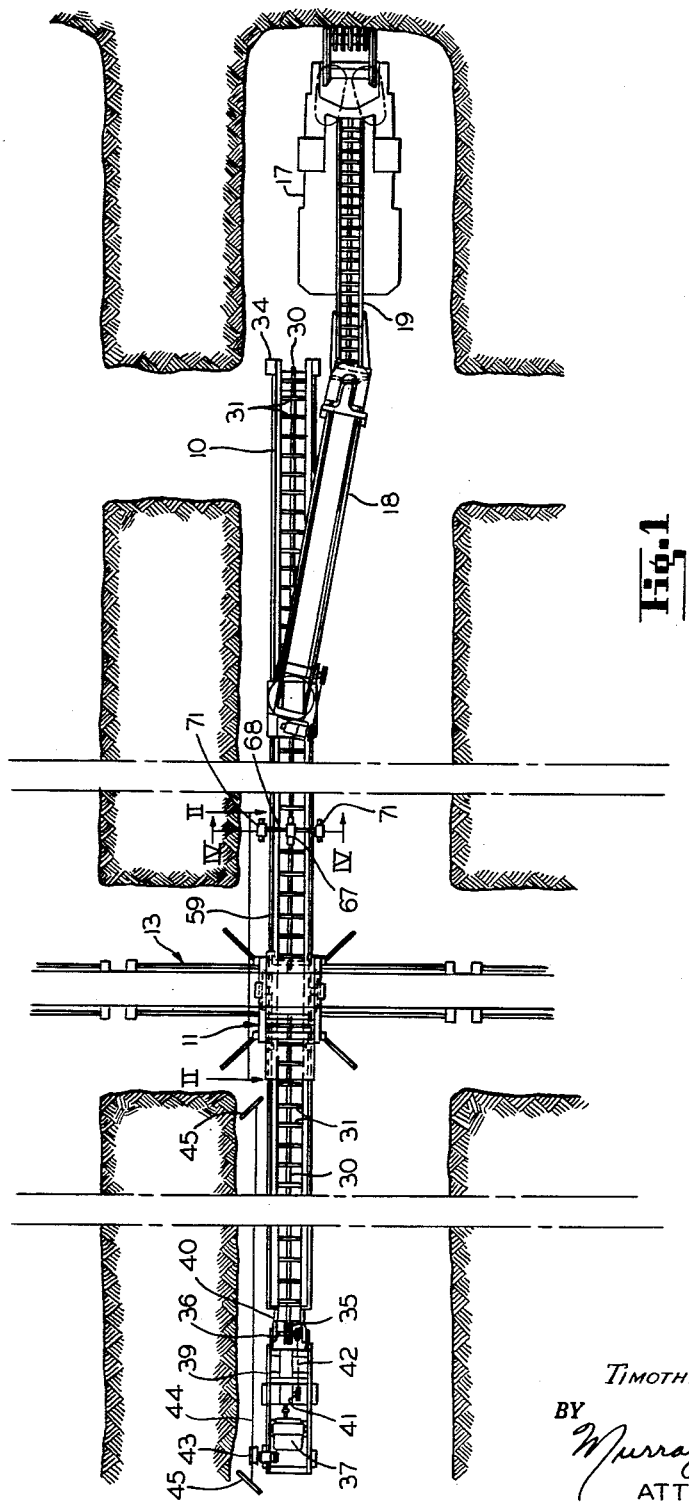

In the embodiment of my invention illustrated in the drawings, a room or transfer conveyor 10 is shown as extending along a room or working place of a mine from a position adjacent the working face thereof.

A transfer station 11 is shown as being connected in the room conveyor intermediate the ends thereof for lifting up the load carrying run of the conveyor and the load carried thereby, and transferring it onto a main cross gathering conveyor 13, herein shown as extending along a break through from one room to another for discharging the gathered coal onto a main room conveyor, which may extend along a room entry and convey the coal to a point where it may be transported from the mine in a usual manner. The main cross conveyor may gather material from a number of rooms, and is herein shown as being a bottom loaded troughed belt conveyor of a relatively large capacity as compared to the capacity of the room conveyor 10, although it need not be such a conveyor and may be any well known form of conveyor desired.

As herein shown, the lower run of the main gathering conveyor 13 carries the load and extends between the load carrying and return runs of the conveyor 10, and is supported intermediate its ends on the transfer station 11 on the usual troughed rollers 15 and 16 as shown in Figure 2. The return run of the conveyor 13 is shown as passing over the top of the load carrying run of the conveyor 10 at the transfer station. The present form of conveyor is used to conserve in the vertical height, that would be required if the two runs of the conveyor were to pass between the load carrying and return runs of the room conveyor.

In Figure 1 of the drawings I have shown a cutting and loading machine 17 of the continuous mining type in position to cut and dislodge and load coal from the solid, and discharge it unto a tail conveyor 18 connected to the discharge end of a conveyor 19 of the continuous mining machine 17. The conveyor 18 is shown as being connected to the conveyor 19 for lateral swinging movement with respect thereto, and to the room conveyor 10 for movement therealong, to continuously load coal onto said room conveyor without interruption. The tail conveyor 18 is commonly known as a "piggyback" type of conveyor, and may be like that shown in application Serial No. 260,215 filed by John R. Madeira on December 6, 1951, and is no part of my present invention so need not herein be shown or described further.

The room or transfer conveyor 10 is herein shown as including a plurality of aligned conveyor pans 21, 21 detachably connected in end to end relation with respect to each other, to accommodate extension of the conveyor as the working face advances (Figure 2). The conveyor pans 21, 21 may be detachably connected together in a usual manner and each have flared side walls 22 extending from the flat bottom thereof and have flanges 23, extending horizontally from the upper ends of said side walls. Angles 24, 24 may be secured at the upper ends of their vertical legs, to opposite sides of the bottom of each pan 21 so as to depend therefrom, with their horizontal legs extending inwardly therefrom, to form a support for the lower run of the conveyor.

The conveyor pans 21, 21 are shown as being supported on ground engaging wheels 25, 25, mounted on stub shafts 26, 26 carried in supporting frame structures 27, 27 extending beneath the conveyor pan 21 along opposite sides of the wheels 25, 25 and along said conveyor pan, to form a mounting for said wheels, for supporting the entire conveyor for advancing movement along the ground, as the working place advances.

The conveying medium of the room or transfer conveyor 10 is herein shown as being a center strand endless chain 30 having spaced flights 31 secured thereto and projecting laterally from opposite sides thereof. The endless chain 30 is shown in Figure 5 as being a roller chain, although it need not be a roller chain, and may be of any form of chain desired.

Figure 4:
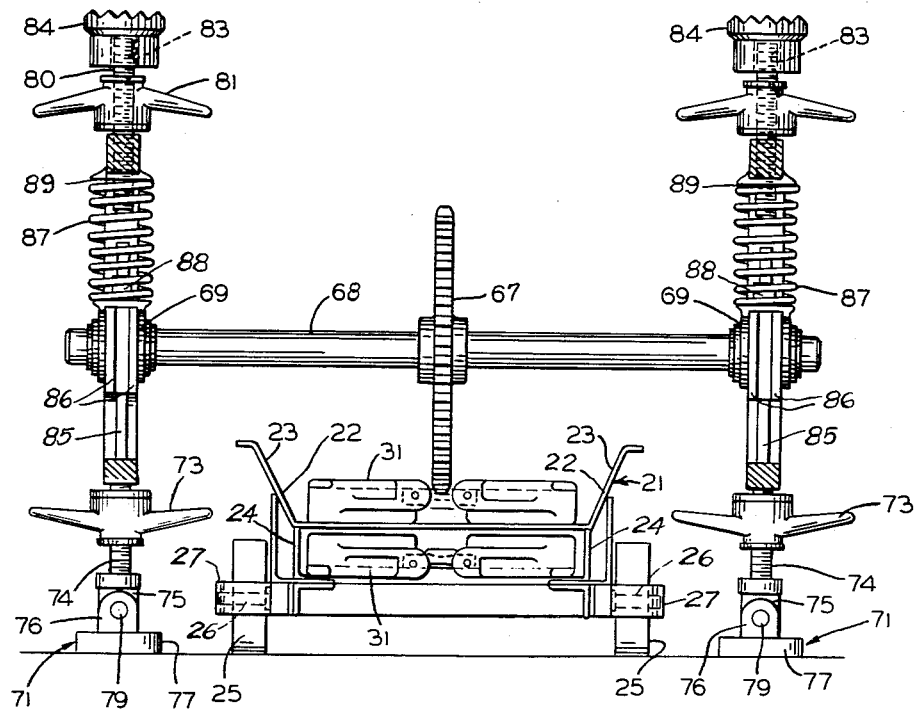
Figure 4 is a transverse sectional view taken substantially along line 4—4 of Figure 2.
Figure 5:
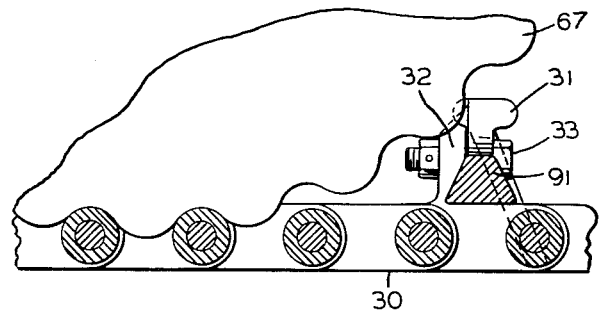
Figure 5 is an enlarged detail view showing the hold-down wheel coming into engagement with the rollers of the conveyor chain, and showing the conveyor chain in longitudinal section.

The flights 31 are shown in Figures 4 and 5 as extending entirely across the bottom of the conveyor pan and as being connected to the chain 30 intermediate their ends on attachments 32 projecting upwardly from certain links of the chain. As shown in Figure 5 nut and bolts 33, 33 are provided to secure the flights 31 to the attachments 32.

It should here be understood that while I have shown through flights connected to endless chain 30 intermediate their ends, that if desired separate flight halves may be connected to the side links of said chain, to reduce the vertcial dimensions of the flights at the chain.

The endless chain 30 and flights 31 may be trained from an inby end pan 34 around a suitable idler at the forward end thereof and along the pan sections 21, 21 to and around a drive sprocket 35 at the rear end of the conveyor, about which said chain and flights change their direction. From thence the chain and flights may be trained beneath the bottom plate 22 to the forward end thereof and be supported on the horizontal legs of angles 24, 24 as is usual with chain and flight conveyors of the type described.

The drive sprocket 35 is shown in Figure 1 as being on a transverse shaft 36. The shaft 36 is driven from a motor 37 on a frame 39 secured to the tail end pan section 40 of the conveyor 10, and projecting rearwardly therefrom. The frame 39 may be a wheeled frame, to readily be advanced as the conveyor 10 is advanced. The drive from the motor 37 may be of any well known form and is herein shown as including a speed reducer 41 and chain and sprocket drive 42.

A winding drum 43 may also be driven from the motor 37 in a suitable manner. The drum 43 is shown as having a cable 44 wound thereabout intermediate its ends and secured at its ends to jacks 45, 45 interposed between the mine roof and floor, for advancing the entire conveyor pan line as desired.

The transfer station 11 is shown in Figures 2 and 3 as comprising a frame member 47 extending along each side of the conveyor and cross connected by transverse braces 49, 49. The frame members 47 are shown as having bifurcated end portions 50, 50 forming brackets for pins 51, 51, having flanged rollers 52, 52 mounted thereon. The frame structures 47, 47 are shown as having depending legs 53, 53 at each end thereof adapted to be jacked down on mine timbers or blocks 54, 54, resting on the mine floor. The legs 53, 53 are of sufficient length to hold the entire frame structures 47 above the top of the associated pan 21 when jacked down on the blocks 54, 54.

When, it is desired to advance the transfer station 11 along the room conveyor 10, the jacks for holding the frame member 47 in position may be released from the mine roof. The timbers 54, 54 may then be removed from beneath the legs 53, 53 to accommodate the flanged rollers 52, 52 to engage the laterally projecting flanges 23, 23 of the pan sections 21, 21, and ride therealong. The transfer station may be then moved along the pan line by connecting the conveyor chain 30 thereto and reversing operation of the conveyor chain to advance the loading station therewith.

The transfer station 11 is also shown as having an upright support 57 for an inclined transfer pan 59 at its forward end. As herein shown, the transfer pan 59 has a depending ear 58, which is pivoted on the upright support 57, as by a pivot pin 60 (see Figure 2). The transfer pan 59 is shown as being nested within a pan 21 at its lower end to lift the conveyor chain 30 and flights 31, 31 and the load carried thereby over the load carrying run of the main cross gathering conveyor 13, for discharging material onto said gathering conveyor.

On the opposite side of the gathering conveyor 13 from the transfer pan 15 is a sprocket 63 meshing with and supporting the endless chain 30 in an elevated position as it passes over the main gathering conveyor 13. The sprocket 63 is shown as being mounted on a transverse shaft 64, journaled at its ends in upright bearing supports 65, 65, projecting upwardly from the frame structure 47, 47. The trough 21 at the far side of the main gathering conveyor 13, and beneath the sprocket 63, is shown as being covered by a peaked inclined cover plate 66 inclined downwardly in opposite directions from the center line of the pan 21 and terminating beyond the lateral margins of the pan 21, to prevent coal which may be carried beyond the conveyor 13 from collecting in said pan and for discharging the fine coal carried past the gathering conveyor onto the ground, where it may readily be cleaned up by hand.

Referring now in particular to the novel form of holddown means at the inby end of the transfer pan 59 for holding the chain 30 and flights 31 to the plane of said pan, a relatively thin stub toothed wheel or sprocket 67 is shown in Figures 2, 4 and 5 as meshing with the rollers of the conveyor chain 30.

The sprocket 67 is shown as being mounted on a transverse shaft 68, journaled at its opposite ends in bearing support members or blocks 69, 69 slidably guided in vertical guides 70, 70 extending along vertically extending standards 71, 71 at each side of the transfer trough 59 at the inby or entering end thereof.

As herein shown, each standard or pedestal 71 is supported at its lower end on a winged nut 73, threaded on a threaded jack shaft 74. The threaded jack shaft 74 has a reduced lower end portion 75, flattened on each side thereof, and extending between spaced ears 76 extending upwardly from a base plate 77 resting on the mine floor. A pin 79 is provided to pivotally connect the portion 75 of the threaded jack shaft to the ears 79. The winged nut 73 and the shaft 74 thus serve to adjust the pedestal vertically to bring the sprocket 67 into proper mesh with the rollers of the chain 30.

In a like manner, the upper end portion of the pedestal 71 has a threaded jack shaft 80 slidably extending therethrough into the guide 70. A winged nut 81, rotatably secured to the upper end portion of the pedestal 71 is shown as being threaded on the shaft 80 and as being rotatably mounted on an upright sleeve portion of the pedestal or standard 71. The threaded shaft 80 is shown as extending within a socket 83 of a roof engaging member 84 movable into clamping engagement with the mine roof upon rotation of the nut 81 to hold the standard 71 between the mine roof and mine floor, and to hold the toothed wheel 67 on transverse support shaft 68 therefor from movement longitudinally of the conveyor during operation thereof, but accommodating vertical movement of the shaft 68 along the guides 70, 70.

The guide 70 within each standard 71 is shown as comprising a vertically extending open portion having two facing guide strips 85, 85 extending therealong. The guide strips 85, 85 are engaged by spaced gibs 86, 86 projecting outwardly from the bearing block 69, from opposite sides thereof. A compression spring 87 is shown as being seated at its lower end on the upper surface of the bearing block 69 and as encircling a lug 88, projecting upwardly therefrom. The upper end of the spring 87 is shown as being recessed within an upwardly recessed seat 89, formed in the upper surface of the standard or pedestal 71, and as encircling the threaded jack shaft 80 when in the position shown in Figure 2.

The toothed wheel 67 is thus normally supported to mesh with the rollers of the center strand conveyor chain 30 and holds the chain to the incline of the transfer pan 59 to convey material upwardly therealong for discharge onto the main cross gathering conveyor 13.

The transverse flights 31 are shown as extending a substantial distance above the chain 30 and as being recessed in their central portion, to form a tooth or bar 91, which when engaged by the toothed wheel 67 lifts the entire wheel and shaft 68 upwardly against the bias of the springs 87, 87. Since the conveyor chain 30 runs quite slowly and since the flights are spaced approximately every seven links, the raising of the toothed hold-down wheel 67 periodically during operation of the conveyor has no effect on the operation of the conveyor.

During operation of the conveyor when loaded with coal for transfer into the main cross gathering conveyor 13, the toothed wheel 67 meshing with the chain 30 will retain said chain to the incline of the inclined loading pan 59. The toothed wheel 67 is sufficiently thin to shear or crack and break lumps of coal encountered and divide the material to pass by opposite sides of said wheel. When, however, the wheel 67 encounters large pieces of rock or material which will not crush, the wheel simply climbs over the rock against the downward bias of the springs 87, 87, and when climbing over the rock exerts a continuous downward force on the conveyor chain 30 through the rock so as to continually exert force on said chain to retain it to the incline of the loading pan 59, when said wheel is both in and out of mesh with said chain.

It will be understood that various modifications and variations of the present invention may be effected without departing from the spirit and scope of the novel concepts thereof.

I claim as my invention:

1. In a conveyor particularly adapted to convey coal and the like in mines underground, a conveyor pan line, an endless conveying element movable therealong, an inclined transfer pan for elevating said conveying element to discharge from an elevated point with respect to said pan line, and means for maintaining a yieldable hold-down force on said conveying element to maintain the same to the incline of said transfer pan and to crack and crush lumps of coal passing therealong comprising a relatively thin rotatable hold-down wheel engaging the load carrying run of said conveying element at the inby end of said transfer pan, a horizontal shaft forming a support for said wheel, vertically extending guide standards at opposite sides of said pan line and having vertical guides therein, means for jacking said standards between a mine floor and roof, bearing blocks guided in said standards for vertical movement therealong and having said shaft journaled therein, and spring means resisting vertical movement of said bearing blocks in an upward direction and accommodating said hold-down wheel to ride over lumps of material incapable of being crushed but maintaining sufficient downward force on said hold-down wheel to maintain said conveying element to the incline of said transfer pan regardless of whether said hold-down wheel is in engagement with said conveying element.

2. A conveyor pan line comprising a plurality of trough sections detachably connected together in end to end relation with respect to each other and having an inclined transfer pan nested therein intermediate the ends thereof and adjustably movable therealong, a conveying element movable along said pan line comprising a center strand endless chain having flights projecting laterally therefrom in opposite directions, standards at each side of said pan line at the inby end of said transfer pan, means detachably holding said standards in fixed relation with respect to said transfer pan, said standards having vertical guides therein having bearing blocks movable therealong, a transverse shaft journaled in said bearing blocks, a toothed wheel on said shaft for meshing with said endless chain and retaining said chain to the inclination of said transfer pan, means yieldably restraining vertical movement of said bearing blocks and wheel in an upward direction, and exerting sufficient downward force on said wheel to crush lumps of coal and the like.

References Cited in the file of this patent

UNITED STATES PATENTS

| | | |
|---|---|---|
| 1,123,999 | Dupuy | Jan. 5, 1915 |
| 1,279,563 | Lowell | Sept. 24, 1918 |
| 1,335,076 | Peasley | Mar. 30, 1920 |
| 2,020,635 | Derome | Nov. 12, 1935 |